US005293895A

United States Patent [19]

Grove et al.

[11] Patent Number: 5,293,895

[45] Date of Patent: Mar. 15, 1994

[54] LIQUID MANAGEMENT APPARATUS FOR SPACECRAFT

[75] Inventors: R. K. Grove, Los Altos; Ronald W. King, San Francisco; Julie M. L'Heureux, Santa Clara, all of Calif.

[73] Assignee: Lockheed Missiles & Space Company, Inc., Sunnyvale, Calif.

[21] Appl. No.: 63,815

[22] Filed: May 20, 1993

Related U.S. Application Data

[62] Division of Ser. No. 810,050, Dec. 19, 1991.

[51] Int. Cl.[5] .................... B64G 1/00

[52] U.S. Cl. .................... 137/154; 137/209; 137/574; 137/590

[58] Field of Search .................... 137/154, 209, 574, 590

[56] References Cited

U.S. PATENT DOCUMENTS 4,399,831 8/1983 Robert .................... 137/154
4,553,565 11/1985 Kerebel .................... 137/590
4,715,399 12/1987 Jaekle et al. .................... 137/209
4,733,531 3/1988 Grove .................... 137/154 X
4,743,278 5/1988 Yeh .................... 137/154 X
4,768,541 9/1988 Uney et al. .................... 137/154
4,901,762 2/1990 Miller et al. .................... 137/574

*Primary Examiner*—Gerald A. Michalsky
*Attorney, Agent, or Firm*—John J. Morrissey

[57] ABSTRACT

In a liquid storage tank 10 for use on a spacecraft, a transfer apparatus 15 (comprising gathering vanes 33, an elongate array of fins 32, and a sponge structure formed from panels 31) functions to transfer liquid from the inner surface of the tank 10 to the vicinity of an outlet line 40. A screen 23 is disposed between the panels 31 and the outlet line 40. When wetted with liquid, the screen 23 prevents gas and/or vapor in the tank 10 from passing to the outlet line 40. A perforated plate 22 disposed between the screen 23 and the outlet line 40 causes liquid to pass from the tank 10 to the outlet line 40 in a regular and generally unbroken flow.

6 Claims, 5 Drawing Sheets

LIQUID MANAGEMENT APPARATUS FOR SPACECRAFT

This application is a division of application Ser. No. 07/810,050, filed Dec. 19, 1991.

TECHNICAL FIELD

This invention relates generally to liquid management systems for use in low-gravity environments, and more particularly to an apparatus for enabling liquid to be withdraw at a controlled rate from a tank on a space vehicle.

BACKGROUND OF THE INVENTION

With techniques of the prior art, the withdrawal of liquid through an outlet of a tank on a spacecraft (e.g., the withdrawal of liquid propellant from a fuel tank for delivery to the thrusters of the spacecraft, or for transfer to another fuel tank on a different space vehicle) in a low-gravity environment would typically involve unstable flow of the liquid propellant at the tank outlet, which tended to entrap bubbles of gas or vapor in the liquid being withdrawn from the tank.

A need has been perceived in the prior art for an apparatus operable in a low-gravity environment for enabling liquid to be withdrawn through an outlet of a tank at a controlled rate, whereby the flow of liquid through the outlet can proceed in a regular and generally unbroken current so as to inhibit entrapment of gas or vapor in the liquid that is being withdrawn from the tank.

SUMMARY OF THE INVENTION

It is a general object of the present invention to provide an apparatus operable in a low-gravity environment for enabling liquid to be withdrawn through an outlet of a tank at a controlled rate.

It is a more particular object of the present invention to provide a liquid management apparatus operable in a low-gravity environment, whereby liquid can be withdrawn through an outlet of a tank on a spacecraft in a regular and substantially unbroken current so as to inhibit entrapment of gas or vapor in the liquid that is being withdrawn from the tank.

BEST MODE OF CARRYING OUT THE INVENTION

Figure 1:
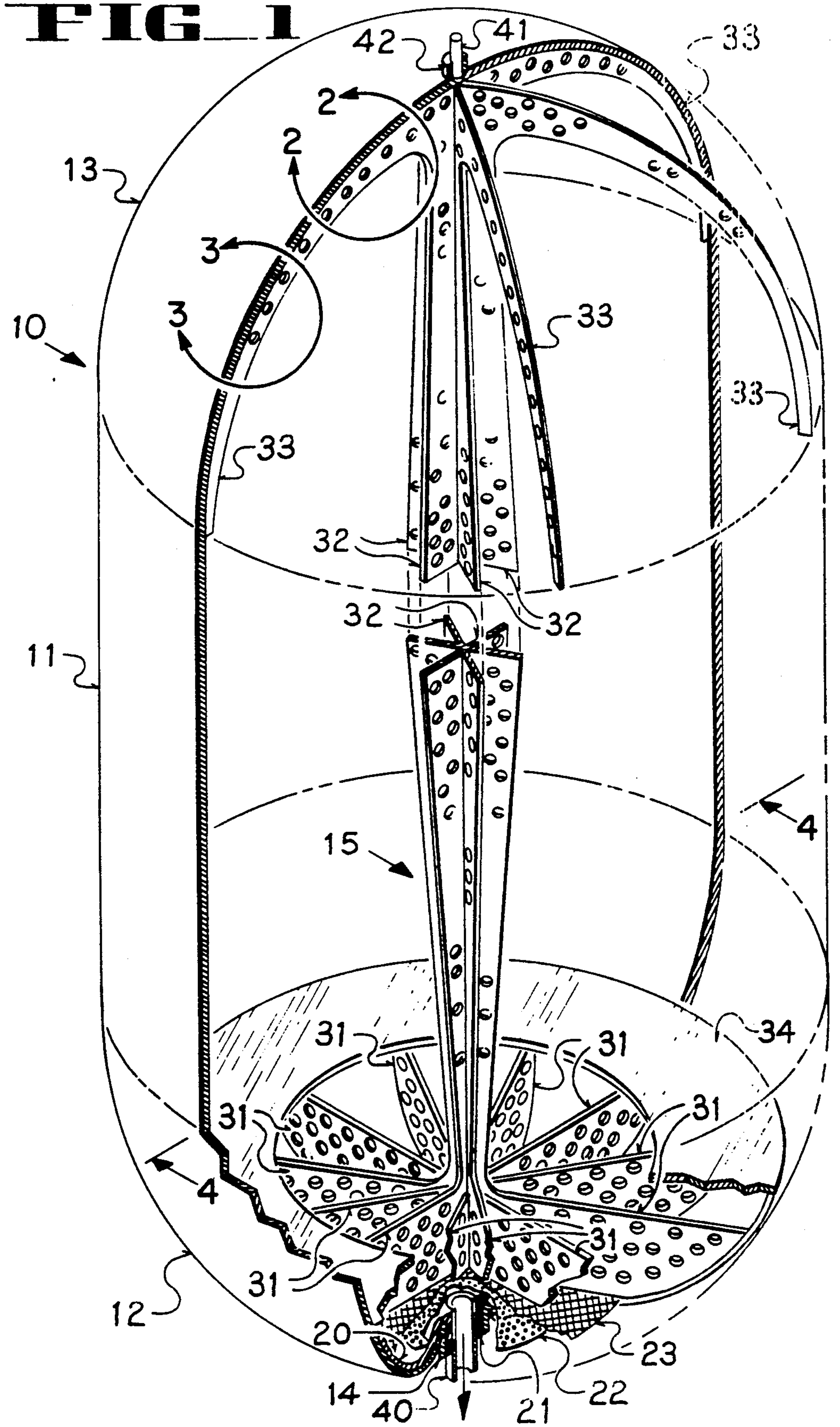
FIG. 1 is a broken-away perspective view of a liquid storage tank showing a first embodiment of a liquid management apparatus according to the present invention, which comprises capillary transfer structure centrally disposed within the tank for gathering and transporting liquid from a remote region of the tank to a reservoir region in the vicinity of the tank's outlet.

A liquid storage tank 10 of characteristic configuration for use (e.g., as a fuel tank) on a rocket or other type of spacecraft is illustrated in broken-away perspective view in FIG. 1. The tank 10 typically comprises a circularly cylindrical central section 11 with enclosing end sections 12 and 13, which are welded onto corresponding ends of the central section 11. The end sections 12 and 13 are generally dome-shaped (typically hemispherical) with apertures at their apices. An outlet conduit 14 leads from the aperture at the apex of the end section 12, and a similar conduit (discussed hereinafter) leads from the aperture at the apex of the end section 13.

The aperture at the apex of the end section 12 is used for filling the tank 10 with liquid, and for draining liquid from the tank 10. In operation, liquid is withdrawn as needed from the tank 10 through the aperture at the apex of the end section 12. The aperture at the apex of the end section 13 can be used for introducing pressurant gas into the tank 10. Ordinarily, the aperture at the apex of the end section 12 is larger than the aperture at the apex of the end section 13.

A liquid transfer apparatus 15 according to the present invention comprises a sponge portion that is mounted in a reservoir region of the tank 10 adjacent the aperture at the apex of the end section 12, and an elongate gathering portion that extends from the sponge portion (or from the vicinity of the sponge portion) into a remote region of the tank 10 away from the end section 12. To install the liquid transfer apparatus 15 within the tank 10, the sponge portion thereof is secured to an inner surface of the end section 12 in such a way that the elongate gathering portion thereof extends away from the aperture at the apex of the end section 12. The cylindrical central section 11 is then fitted around the elongate gathering portion of the liquid transfer apparatus 15 so that a circular edge at one end of the central section 11 can be welded to a matching circular edge of the end section 12. Finally, a circular edge of the other end section 13 is welded to a matching circular edge at the other end of the central section 11 in order to close the tank 10 so that liquid can be contained therein.

The sponge portion of the liquid transfer apparatus 15 comprises a bowl structure 20, which has an outer surface that is contoured to fit snugly against the inner surface of the end section 12. An outlet duct 21 leads from an aperture at a bottom portion of the bowl structure 20, and extends through the outlet conduit 14 at the apex of the end section 12 when the outer surface of the bowl structure 20 is fitted against the inner surface of the end section 12. The outer surface of the bowl structure 20 is spot-welded or otherwise fixedly secured to the inner surface of the end section 12.

A circular perforated plate 22, whose function is described hereinafter, is secured (as by welding) to the inner surface of the bowl structure 20 adjacent the aperture at the bottom portion thereof so as to repose generally perpendicularly with respect to the outlet duct 21 and the cylindrical axis of the central section 11. A circular screen 23 with capillary-size openings, whose function is also described hereinafter, is secured (as by welding) to the inner surface of the bowl structure 20 further away than the perforated plate 22 from the outlet duct 21, so that the perforated plate 22 is disposed between the screen 23 and the outlet duct 21.

An array of panels 31 is secured to the inner surface of the bowl structure 20 adjacent the screen 23, so that the screen 23 is disposed between the panels 31 and the perforated plate 22. Proximal edges of the panels 31 are attached to each other (as by welding) so that the panels 31 extend radially outward at substantially equal angular intervals from a common axis. In FIG. 1, twelve such panels 31 are illustrated forming the array. Distal edges of the panels 31 remote from the common axis abut the inner surface of the bowl structure 20, and are secured thereto (as by welding).

In a first embodiment of the present invention as illustrated in FIG. 1, the elongate gathering portion of the liquid transfer apparatus 15 comprises an array of fins 32 extending out of the bowl structure 20 from the panels 31 into the remote region of the tank 10. As shown in FIG. 1, the fins 32 are integral extensions of six of the twelve panels 31. Alternatively, however, the fins 32 could be separate structural entities attached to the array of panels 31. Proximal edges of the fins 32 are secured (as by welding) so that the fins 32 extend radially outward at substantially equal angular intervals from a common axis, which is effectively an extension of the common axis of the panels 31. This common axis of the panels 31 and of the fins 32 substantially coincides with the cylindrical axis of the central section 11 of the tank 10.

Figure 2:
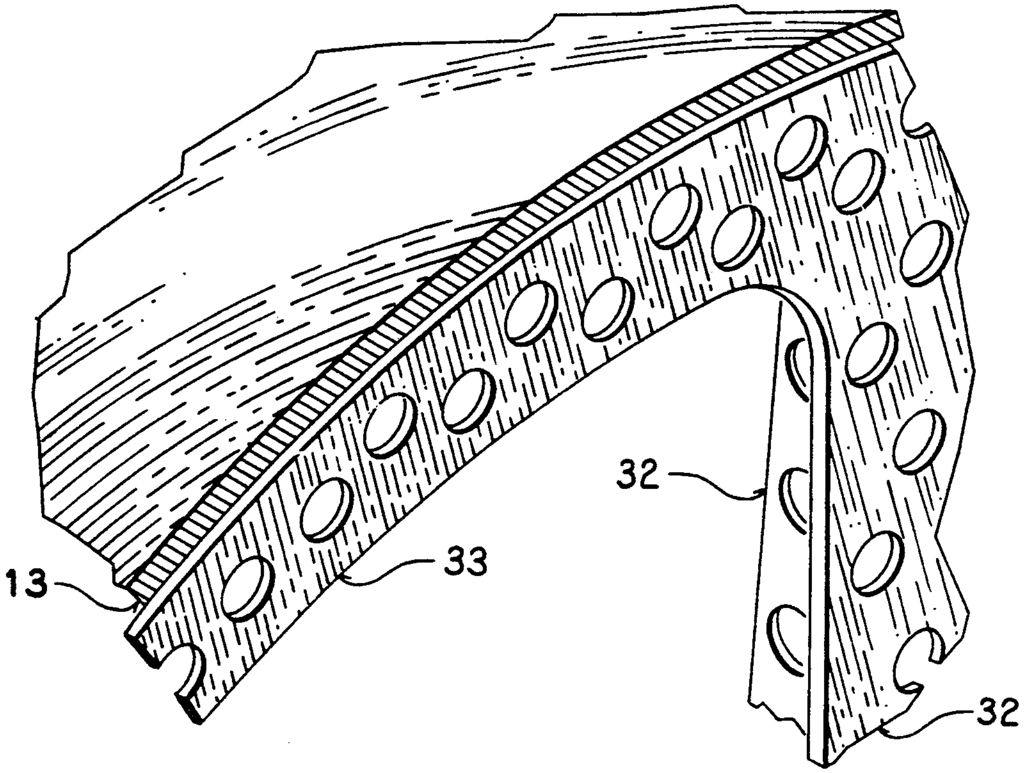
FIG. 2 is an enlarged view of the portion of the tank shown within the encircling line 2—2 of FIG. 1.
Figure 3:
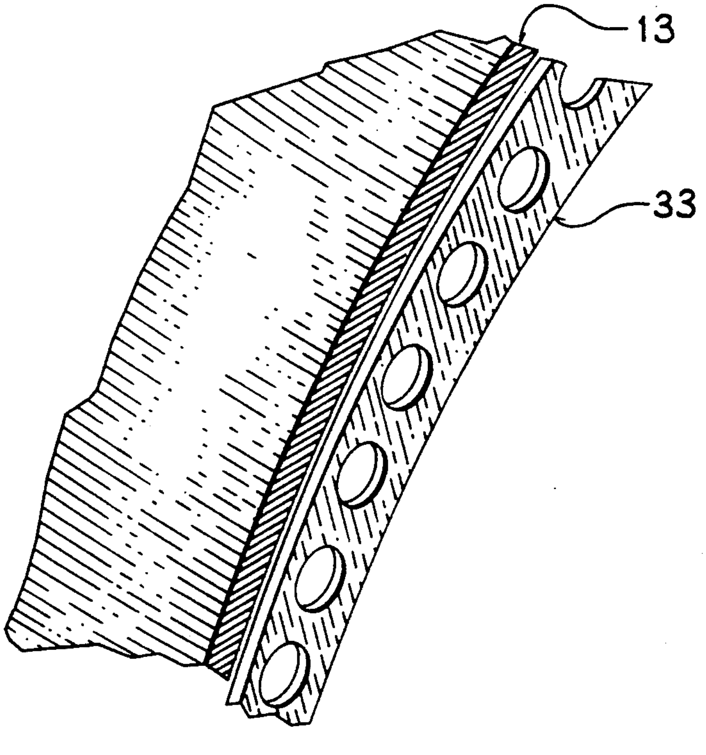
FIG. 3 is an enlarged view of the portion of the tank shown within the encircling line 3—3 of FIG. 1.

An array of gathering vanes 33 extends radially outward from distal ends of corresponding fins 32 in the vicinity of the aperture at the apex of the dome-shaped end section 13. Each of the gathering vanes 33 is arcuately configured so that a distal edge thereof is contoured generally like the inner surface of the end section 13, but is separated from the inner surface of the end section 13 by a capillary distance. Preferably, the capillary separation between the distal edge of each gathering vane 33 and the inner surface of the end section 13 decreases in a direction from the end of the gathering vane 33 toward the apex of the dome-shaped end section 13 as indicated in FIGS. 2 and 3.

Figure 4:
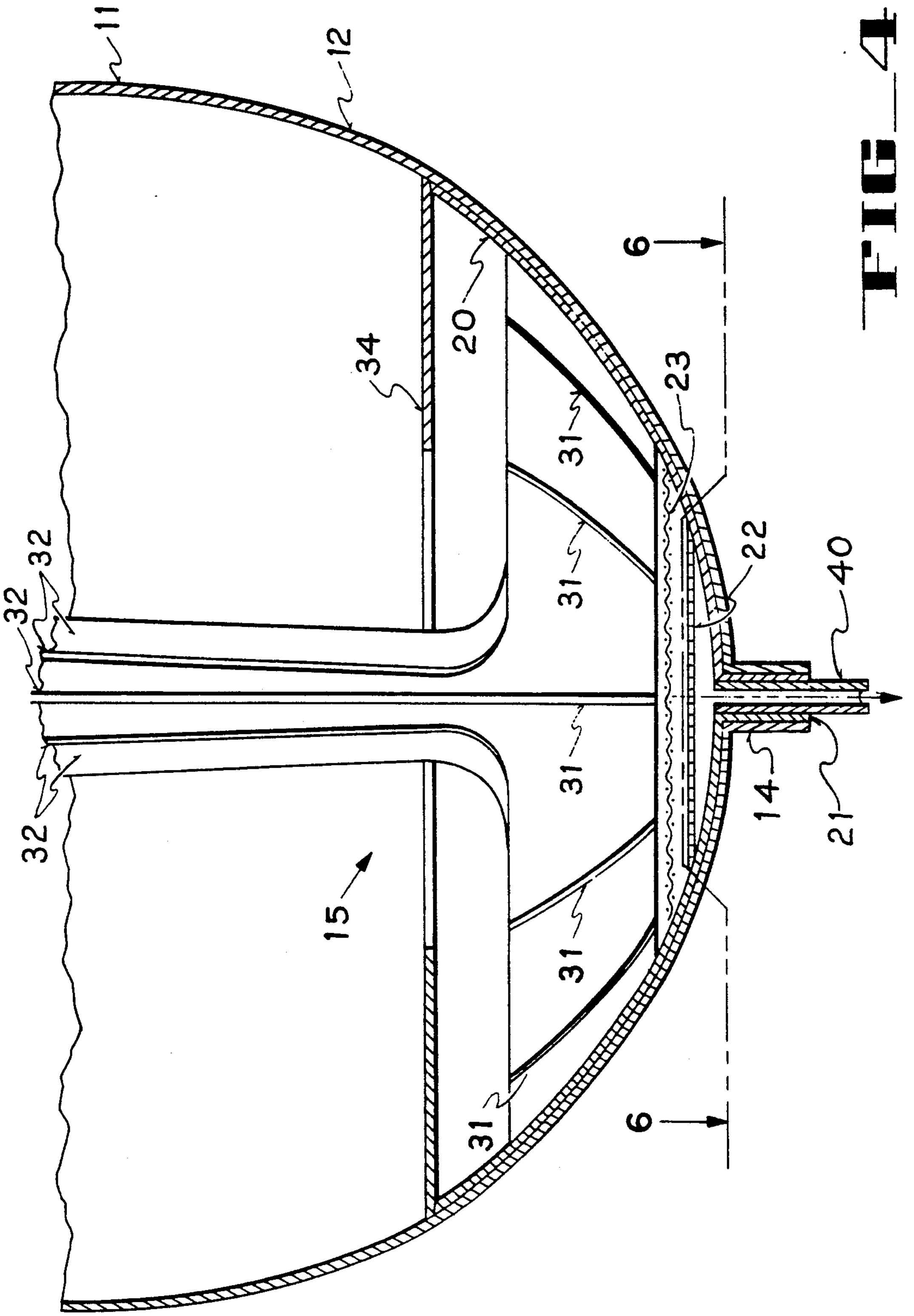
FIG. 4 is a longitudinal cross-sectional view of a portion of the tank in the vicinity of the tank's outlet as viewed along line 4—4 of FIG. 1.

As illustrated in longitudinal cross section in FIG. 4, an annular lid 34 is secured (as by welding) to a circular rim portion of the bowl structure 20. The lid 34 generally demarcates the boundary of a reservoir region of the tank 10 as defined by the bowl structure 20 in which the array of panels 31 is situated. The fins 32 extend away from the array of panels 31 through a central aperture in the lid 34 into the remote region of the tank 10. The lid 34 functions as a baffle to facilitate retention within the bowl structure 20 of liquid propellant that is not otherwise retained therein by surface tension, particularly as the spacecraft on which the tank 10 is deployed undergoes accelerations.

A so-called "fill, drain and feed line" 40 is securely fitted in a conventional manner into the outlet duct 21 leading from the bottom portion of the bowl structure 20 through the outlet conduit 14 at the apex of the end section 12. The tank 10 is filled with liquid through the "fill, drain and feed line" 40. After the tank 10 has been filled with liquid, the "fill, drain and feed line" 40 is closed by conventional valve means not shown in the drawing. The tank 10 can be drained through the "fill, drain and feed line" 40 during routine maintenance. In operation, liquid is withdrawn from the reservoir region of the tank 10 through the "fill, drain and feed line" 40.

A so-called "pressurant and vent line" 41 is securely fitted in a conventional manner into ducting 42 leading from the aperture at the apex of the dome-shaped end section 13. When the tank 10 is being filled with liquid, the "pressurant and vent line" 41 is opened by conventional valve means (not shown in the drawing) to enable gas and/or vapor that is displaced by the liquid to exit from the tank 10. In operation in a low-gravity environment, pressurant gas is introduced into the tank 10 through the "pressurant and vent line" 41 to drive liquid from the remote region toward the reservoir region of the tank 10.

In a standardized implementation of the present invention according to the embodiment illustrated in FIG. 1, the length of the tank 10 along the longitudinal axis from the apex of the end section 12 to the apex of the end section 13 is approximately 240 inches, and the transverse cross-sectional diameter of the central section 11 is approximately 120 inches. In this implementation, all components except the screen 23 are fabricated from sheets of aluminum alloy (preferably 2219-T81 alloy) of approximately 0.070-inch thickness. The screen 23 is made of stainless steel filaments of approximately 50×150 mesh of "Plain Dutch" weave. The sheets from which the panels 31, the fins 32 and the gathering vanes 33 are made are perforated to facilitate capillary flow of liquid over the surfaces thereof. The perforations in the panels 31, the fins 32 and the gathering vanes 33 are approximately 0.10 inch in diameter, and constitute approximately 25% of the total area thereof. The perforations in the perforated plate 22 are likewise approximately 0.10 inch in diameter, and constitute approximately 25% of the total area thereof. The annular lid 34 is made of a non-perforated sheet with a central aperture having a diameter on the order of 60 inches. The "fill, drain and feed line" 40 is typically made from aluminum tube stock of approximately 3.5-inch outside diameter and 0.25-inch wall thickness. The "pressurant and vent line" 41 is typically made from thin-walled aluminum tube stock. It is noted that the aforementioned dimensions are not critical, but are provided to give an indication of scale for a practical embodiment of the invention.

Figure 5:
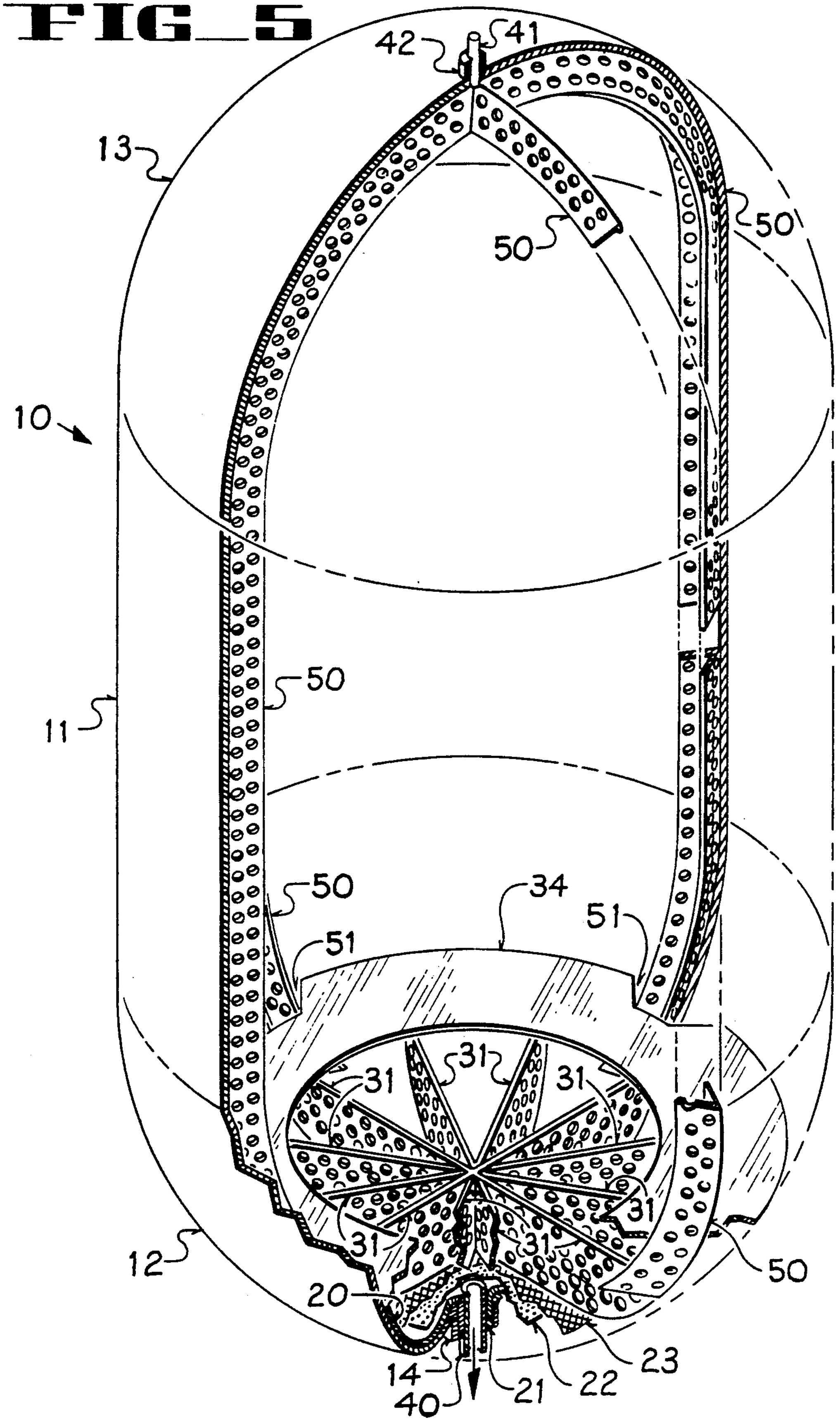
FIG. 5 is a broken-away perspective view of a liquid storage tank showing a second embodiment of a liquid management apparatus according to the present invention, which comprises a capillary transfer structure disposed adjacent an inner surface of the tank for gathering and transporting liquid from a remote region of the tank to a reservoir region in the vicinity of the tank's outlet.
Figure 6:
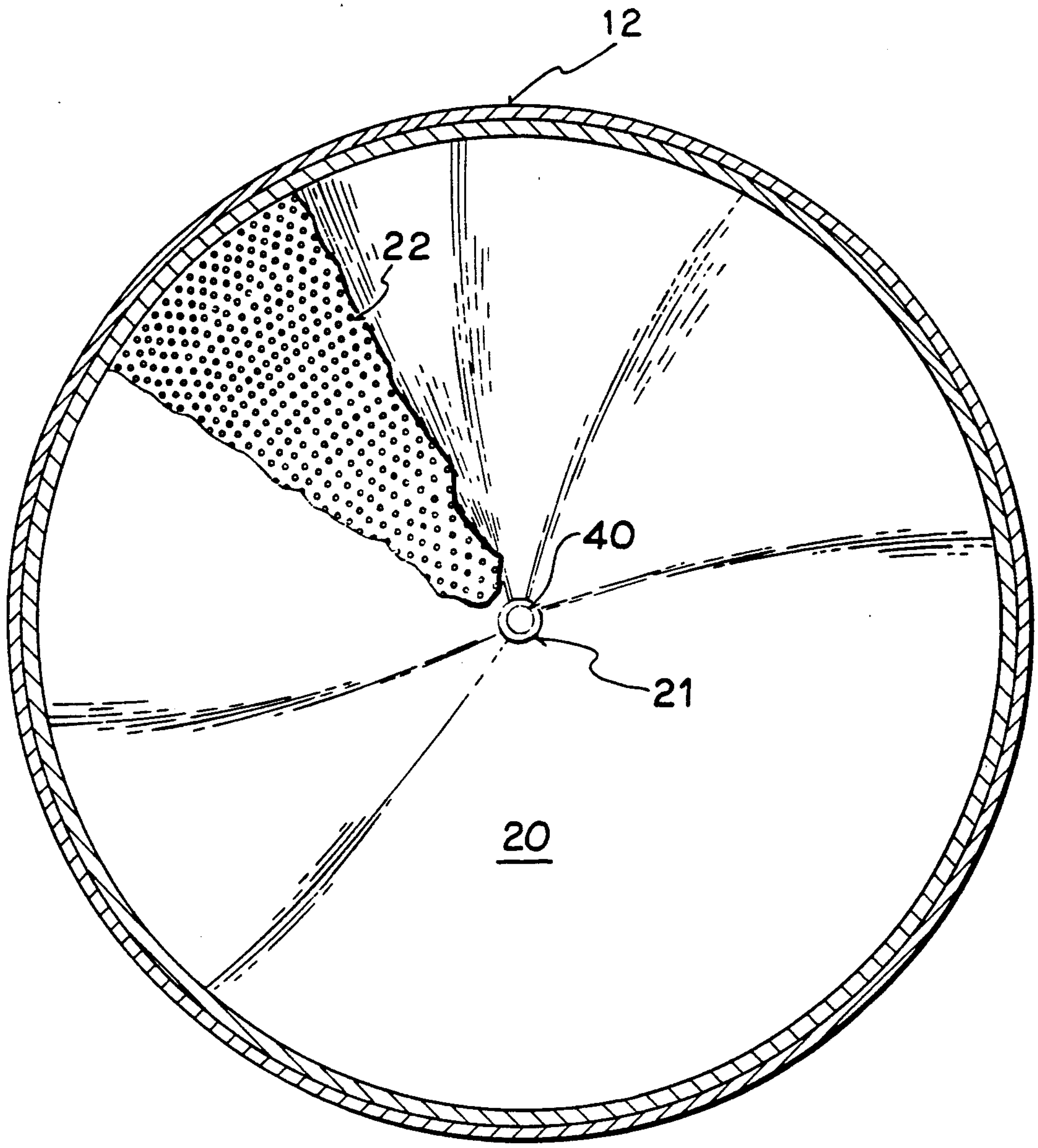
FIG. 6 is a transverse cross-sectional view, partially broken-away, along line 6—6 of FIG. 4.

In a second embodiment of the present invention as illustrated in FIG. 5, the liquid transfer apparatus 15 of FIG. 1 (with its axially extending array of fins 32) is replaced by a structurally different type of liquid transfer apparatus, which consists of a plurality of gathering arms 50 secured to the inner surface of the tank 10. The gathering arms 50 are of generally V-shaped transverse cross-sectional configuration, and extend from the reservoir region of the tank 10 in the vicinity of the panels 31 out of the bowl structure 20 through appropriately configured apertures 51 on the outer periphery of the annular lid 34 into the remote region of the tank 10 to the vicinity of the aperture at the apex of the end section 13. In FIG. 5, four such gathering arms 50 are shown, which are arranged at substantially equal angular intervals around the inner surface of the tank 10.

Each of the gathering arms 50 has a central edge, which defines the locus of the apex of the V-shaped transverse cross section thereof. The central edge of each gathering arm 50 is shaped in general conformity with the contour of the inner surface of the tank 10 from the vicinity of the circular rim portion of the bowl structure 20 to the aperture at the apex of the end section 13. The central edges of the gathering arms 50 are welded to the inner surface of the tank 10 in the remote region of the tank 10 outside the bowl structure 20. Within the bowl structure 20, the central edges of the gathering arms 50 are separated from the interior surface of the bowl structure 20 by a capillary distance. The proximal end of each gathering arm 50 within the bowl structure 20 is separated by a capillary distance from a corresponding one of the panels 31.

In a standardized implementation of the present invention according to the embodiment illustrated in FIG. 5, the gathering arms 50 are fabricated from perforated strips of aluminum alloy (preferably 2219-T81 alloy) of approximately 0.070-inch thickness with perforations of approximately 0.10 inch in diameter constituting approximately 25% of the total strip area. The strips have a width of approximately 16 inches, and are bent at mid-width to form a V-shaped channel with an included angle of approximately 60°. Again, the aforementioned dimensions are not critical, but are provided to give an indication of scale for a practical embodiment of the invention.

The mechanism of capillary pumping of liquid from the inner surface of the tank 10 along "gathering surfaces", e.g., along the surfaces of the gathering vanes 33 and the fins 32 in the embodiment of FIG. 1, or along the surfaces of the V-shaped gathering arms 50 in the embodiment of FIG. 5, to the surfaces of the panels 31 under conditions of low gravity is well understood in the art, and is discussed in (among other references) the text of U.S. Pat. No. 4,733,531. The screen 23, which remains wetted with a film of liquid because of surface tension even after liquid has been withdrawn to a large extent from the reservoir region, provides a barrier to the passage of gas and/or vapor through the perforated plate 22 to the "fill, drain and feed line" 40 when liquid is being withdrawn from the tank 10.

Because of the screen 23, liquid reaching the perforated plate 22 is substantially "bubble free"—i.e., there is no significant amount of gas or vapor entrapped in the liquid that reaches the perforated plate 22. Liquid (which is substantially gas-free and vapor-free) spreads over the surface of the perforated plate 22, and tends to pass at a uniform rate through the perforations therein when the "fill, drain and feed line" 40 is opened. The perforated plate 22 imposes a pressure drop to "even out" the flow of liquid through the perforations therein across the surface of the plate 22, which results in a regular and generally unbroken flow of liquid at a controlled rate out of the tank 10. Typically, the perforations in the circular perforated plate 22 are closer together near the outer edge thereof and are further apart near the center—i.e., the spacing between perforations decreases with increasing radius outward from the center of the perforated plate 22.

The present invention has been described above in terms of particular embodiments. However, other embodiments within the scope of the invention would be apparent to practitioners skilled in the art upon perusal of the foregoing description and the accompanying drawing. Therefore, the foregoing description and the drawing are merely illustrative of the invention, which is more generally defined by the following claims and their equivalents.

We claim:

1. An apparatus comprising:

a) tank means defining a reservoir for a liquid, said tank means having an outlet conduit;

b) a bowl structure secured to an inner surface of said tank means adjacent said outlet conduit, said bowl structure having an outlet duct dimensioned to extend into said outlet conduit of said tank means;

c) liquid storage means disposed within said bowl structure, said liquid storage means being secured to an inner surface of said bowl structure, said liquid storage means comprising an array of panels, proximal edges on said panels being secured together along a common axis that is substantially aligned with said outlet duct of said bowl structure, said panels extending outward from said common axis to the inner surface of said bowl structure, distal edges on said panels being secured to the inner surface of said bowl structure;

d) capillary pumping means secured to the inner surface of said tank means, said capillary pumping means functioning in a low-gravity environment to gather liquid from a region of said tank means remote from said outlet conduit and to move liquid so gathered to said liquid storage means within said bowl structure by capillary action;

e) a screen secured to the inner surface of said bowl structure between said liquid storage means and said outlet duct of said bowl structure, said screen functioning as a gas barrier to prevent passage of gas into said outlet duct of said bowl structure when said screen is wetted by liquid in said bowl structure; and f) a flow control plate secured to the inner surface of said bowl structure between said gas barrier screen and said outlet duct of said bowl structure, said flow control plate having perforations that are dimensioned and positioned so that liquid from said bowl structure can pass therethrough into said outlet duct for passage to said outlet conduit of said tank means at a substantially uniform rate of flow.

2. The apparatus of claim 1 wherein said panels are perforated.

3. The apparatus of claim 1 wherein said capillary pumping means comprises a plurality of gathering arms extending along the inner surface of said tank means between said remote region of said tank means and said bowl structure.

4. The apparatus of claim 3 wherein each of said gathering arms has a generally V-shaped transverse cross-sectional configuration, each of said gathering arms being secured to the inner surface of said tank means along a central edge defining the locus of the apex of V-shaped cross section.

5. The apparatus of claim 1 wherein said flow control plate is of generally circular configuration, spacings between perforations in said flow control plate decreasing with increasing radius outward from the center of said flow control plate.

6. The apparatus of claim 1 further comprising an annular lid structure mounted within said tank means so as to function as a baffle to facilitate retention of liquid in said bowl structure when said tank means undergoes acceleration.

* * * * *